June 24, 1941. A. E. GENTRY 2,246,882

VEHICLE WHEEL SUPPORTING TRUCK

Filed Sept. 21, 1940

INVENTOR.
Arthur E. Gentry
BY Lancaster, Allwine and Rommel
ATTORNEYS.

Patented June 24, 1941

2,246,882

UNITED STATES PATENT OFFICE 2,246,882

VEHICLE WHEEL SUPPORTING TRUCK

Arthur E. Gentry, Eldorado, Ill.

Application September 21, 1940, Serial No. 357,804

2 Claims. (Cl. 280—61)

The invention relates to improvements in trucks for use in removing and replacing heavy vehicle wheels.

An object of the invention is to provide a vehicle wheel supporting platform mounted on casters and skirted by a flange.

Another object of the invention is the provision of a vehicle wheel supporting platform skirted by a flange and having reinforced corner portions mounted on casters.

Other objects and advantages of the invention will become apparent during the course of the following detailed description, taken in connection with the accompanying drawing, forming a part of this specification, and in which drawing, Figure 1 is a view in side elevation of the improved truck and showing a vehicle wheel supported thereon, and with the wheel attached to the vehicle.

Figure 1:
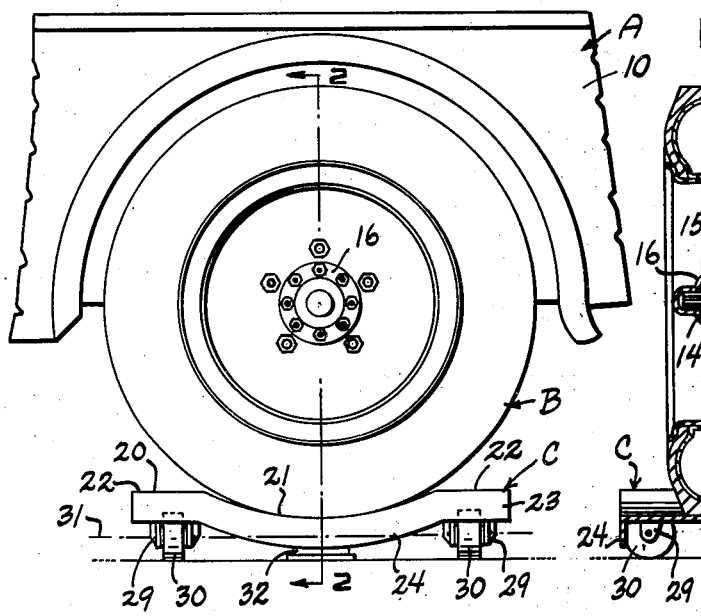
Figure 2:
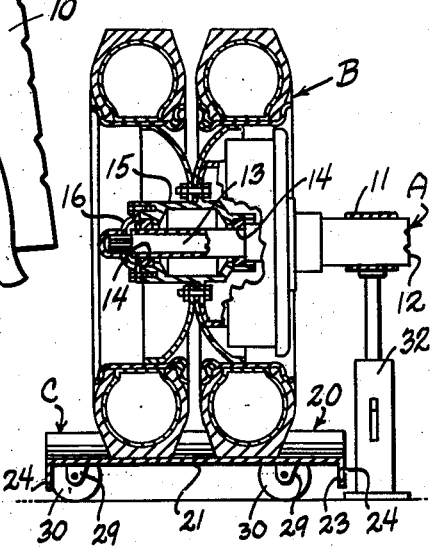
Figure 2 is a vertical cross sectional view on the line 2—2 of Figure 1.

In the drawing, which for the purpose of illustration show only a preferred embodiment of the invention, and wherein similar reference characters denote corresponding parts thruout the several views, the letter A designates a vehicle equipped with a dual wheel B, and C designates the improved wheel supporting truck.

The vehicle A may include a body 10 supported at a spring seat 11 on an axle housing 12 enclosing an axle 13. Rotatably mounted on the axle housing 12, as by bearings 14, is the dual wheel B having its hub 15 fastened for rotation with the axle, as by a removable cap 16.

Figure 3:
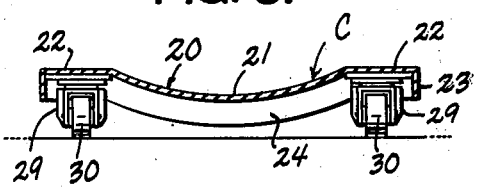
Figure 3 is a vertical longitudinal sectional view of the truck.
Figure 4:
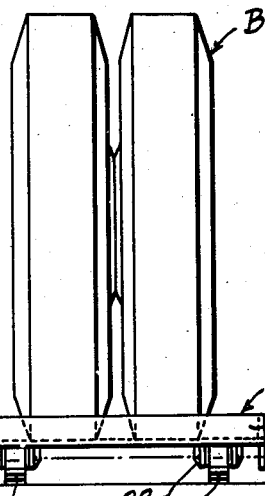
Figure 4 is a view in end elevation of the truck and showing a vehicle wheel supported thereon, after removal from the vehicle.
Figure 5:
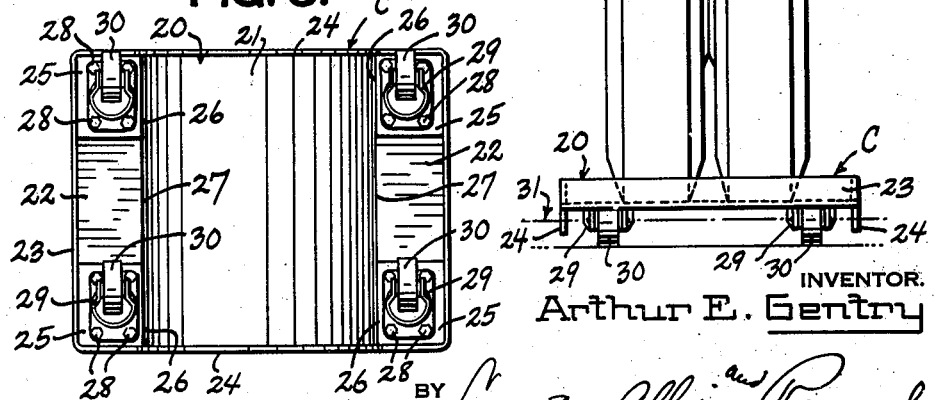
Figure 5 is an inverted plan view of the truck.

The improved wheel supporting truck C comprises an elongate rectangular sheet metal platform 20 including an intermediate portion 21 curved longitudinally of the platform to provide a wheel supporting bed extending thruout the width of the platform, and co-planar end portions 22 flanking the intermediate portion. Skirting the platform is a depending right angular quadrilateral flange 23 of uniform width, as shown in Figs. 1 and 3, and including curved portions 24 subjacent the curved intermediate portion 21 of the platform.

Secured beneath the corner portions of the platform, as by welding, and abutting two sides of the quadrilateral flange 23 are rectangular sheet metal plates 25 each aligning along one side edge 26 with the juncture 27 of the intermediate portion 21 and one of said end portions 22.

Attached to the plate 25 at their lower faces, as by bolts 28, are casters 29 including wheels 30 supporting the platform with the mid-sections of the curved flange portions 24 in closely spaced relation to the floor, and with the flange 23 in the vicinity of the casters 29 spaced a greater distance from the floor and above the horizontal plane common to the axes 31 of the caster wheels 28. With this arrangement, the casters 29 may be disposed relatively close to the corners of the platform and the wheels may swing into and out of positions wherein their peripheries are intersected by the vertical planes of the quadrilateral flange 23, while maintaining a clearance between the wheels and the lowermost edges of the flange.

In removing the wheel B from the vehicle A, the wheel is elevated, as by the use of a suitable jack 32 beneath the spring seat 11. In order that the axle 13 be horizontally disposed, or parallel to the floor, both sides of the vehicle may be elevated, as by the use of a jack at each side, or by the use of a single jack centrally of the vehicle body. Upon elevation of the vehicle wheel B, the truck C may be rolled laterally therebeneath. The flange 23 being spaced a relatively great distance from the floor subjacent the end portions of the platform, provides hand-grip members facilitating manipulation of the truck. By partially lowering the jack, the weight of the wheel B may be transferred from the vehicle to the truck without permitting any appreciable portion of the weight of the vehicle to bear thereon. After the wheel B is disconnected from the vehicle, as by removal of the cap 16 and associated parts, the truck, together with the wheel, may be pulled from the axle housing 12, without disturbing the co-axial alignment of the wheel with the axle housing. Thereafter, the wheel may be transported on the truck to any desired location for inspection or repairs, as by manually pushing the wheel, or by shoving the truck in the desired direction by thrusting the foot against one of the specially reinforced corner portions of the platform. The procedure for replacing the wheel B is of course the reverse of that for removal.

It will therefore be seen that I have provided an improved truck for use in the removal and replacement of heavy vehicle wheels and including a strong and rigid platform bounded by a depending right angular quadrilateral flange, and wherein the corner portions of the platform are provided with reinforcement plates and supported by caster wheels.

Various changes may be made in the form of invention herein shown and described without departing from the spirit of the invention or the scope of the following claims.

I claim:

1. A truck for use in the removal and replacement of heavy vehicle wheels, said truck comprising a rectangular sheet metal platform including spaced co-planar end portions and an intermediate portion curved longitudinally of the platform to provide a trough-like wheel-supporting bed extending thruout the width of the platform, said platform being bounded by a right angular depending quadrilateral flange of uniform width and curving subjacent the curved edges of said intermediate portion, and caster wheels secured beneath said end portions for supporting the platform inwardly adjacent its corners with the mid-sections of the curved portions of said flange spaced a given short distance from the floor, said caster wheels being swingable into positions wherein the planes of said quadrilateral flange intersect the peripheries of said caster wheels, said flange in the vicinity of said caster wheels being spaced from the floor by said caster wheels a distance greater than said given distance, and disposed above a horizontal plane intersecting the axes of the caster wheels to provide clearance between the peripheries of the caster wheels and said flange.

2. A truck for use in the removal and replacement of heavy vehicle wheels, said truck comprising an elongate rectangular sheet metal platform including spaced co-planar end portions and an intermediate portion curved longitudinally of the platform to provide a trough-like wheel-supporting bed extending thruout the width of the platform, said platform being skirted by a right angular depending quadrilateral flange of uniform width and curving subjacent the curved edges of said intermediate portion, rectangular sheet metal plates secured beneath said end portions inwardly adjacent the corners of said platform, each plate abutting two sides of said quadrilateral flange and aligning along one side with the juncture of the intermediate portion and one of said end portions, and caster wheels attached to said plates for supporting the platform in spaced relation to the floor.

ARTHUR E. GENTRY.